March 19, 1929.  H. SOSS  1,705,509
WHEEL
Filed March 11, 1927
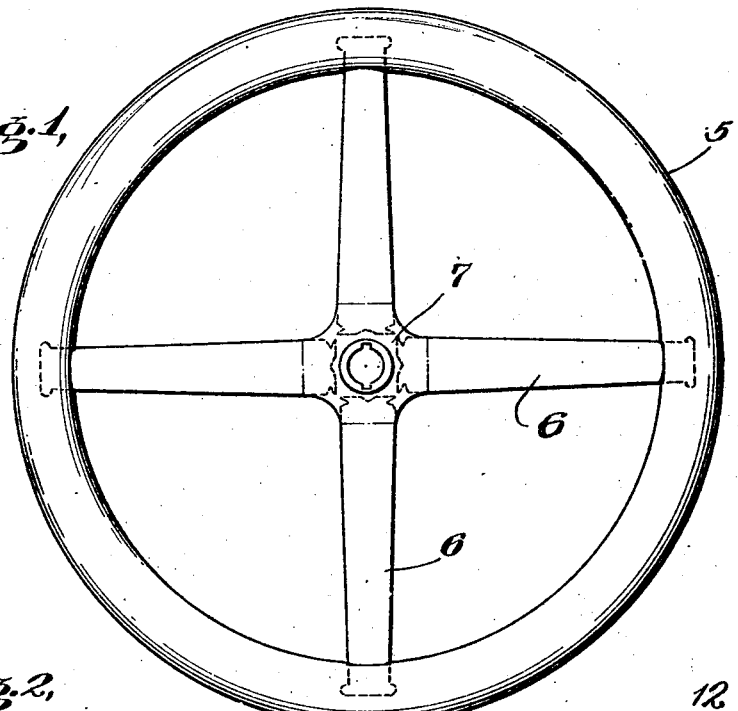
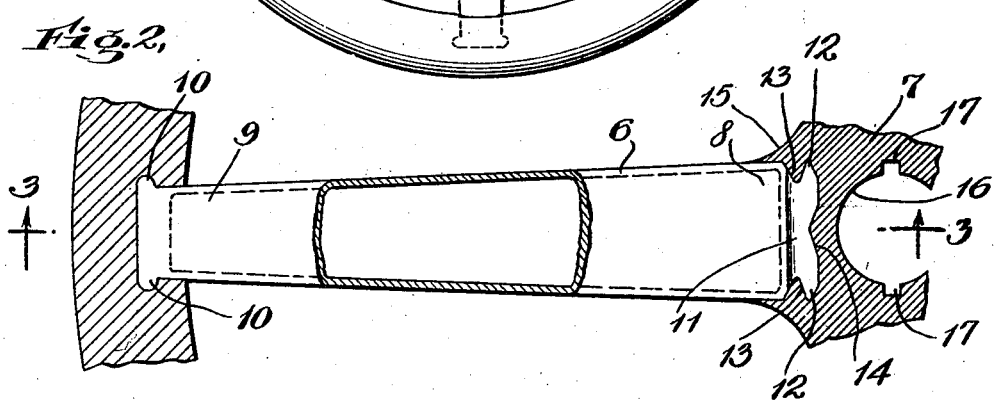
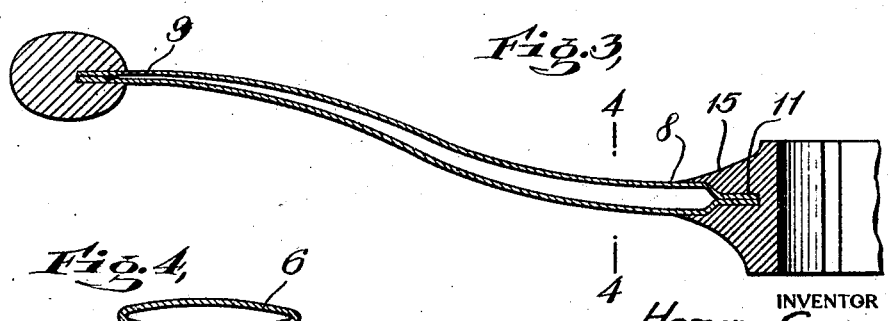
INVENTOR
Henry Soss
BY
ATTORNEY Patented Mar. 19, 1929.

1,705,509

UNITED STATES PATENT OFFICE.

HENRY SOSS, OF BROOKLYN, NEW YORK.

WHEEL.

Application filed March 11, 1927. Serial No. 174,525.

This invention relates to wheels and particularly to the steering wheels of motor vehicles; and the object of the invention is to provide an improved spider construction for wheels of the class specified, the arms of the spider being preferably formed from tubing fashioned into comparatively flat and wide as well as curved and tapering arms, the outer ends of which are anchored or secured to the arm portion and the inner ends secured and imbedded in the hub portion; a further object being to provide a cast hub portion for wheels of the class specified, said hub portion being cast around the inner ends of the spider arms, and said arms being fashioned to anchor the same against movement or displacement in the hub portion; and with these and other objects in view, the invention consists in a wheel of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a plan view of a wheel made according to my invention.

Fig. 2 is a sectional plan view of a part of the rim and hub portion, and showing one of the spider arms with part of the construction broken away.

Fig. 3 is a section on the line 3—3 of Fig. 2; and,

Fig. 4 is a section on the line 4—4 of Fig. 3.

In the drawing, 5 represents the rim portion of a steering wheel which may be of any desired construction and to which is secured four spider arms 6, arranged at ninety degrees to each other, and the inner adjacent ends of which are mounted in connection with and secured to the hub portion 7 of the wheel.

The arms 6 are made from a tubular body which tapers from the inner or hub end 8 to the outer or rim end 9 as clearly seen in Figs. 1 and 2. The tube is preferably curved upwardly and outwardly from the end 8 to the end 9 as seen in Fig. 3 of the drawing, and the thickness of the tube at the end 8 of the arm is greater than at the end 9, the end 9 having lateral extensions 10 for anchoring the arms to the rim 5, while the end 8 of the arms is pressed to bring the said walls together to form a flat anchor member 11, having projecting members 12 at opposite sides forming corresponding grooves 13. The inner end of the member 11 is provided with a V-shaped notch 14.

In forming the wheel, the hub portion 7 is cast, preferably by die casting, around the inner adjacent ends of the arm 6. The metal of the hub portion extends well into the inner ends 8 of the arms 6 as seen at 15 and enters the grooves 13 as well as the notches 14 of the arms to key and anchor said arms in the hub portion. As is customary, the hub portion is provided with a bore 16 extending centrally therethrough, and opening through top and bottom faces thereof, said bore having key-ways 17 for keying the wheel to the steering posts of the vehicle.

By constructing the spider arms of wheels of the class described, of tubing fashioned substantially in the manner herein shown and described, I provide a light as well as strong and durable spider construction, as well as one of neat and finished appearance, the side edges of the spider arms being rounded in the elliptical formation thereof, it being understood that the central longitudinal portions of the arms are of greater thickness than the side edge portions as clearly seen in Fig. 4 of the drawing. It will also be understood that when the wheel is completed, and the metal polished or coated with nickel or other plating, the hub and arm construction will represent a substantially unitary body, the metal of the hub portion gradually extending onto the arms as clearly seen in the drawing.

It will be understood that my invention is not necessarily limited to the specific details of construction herein shown and described, and especially with regard to the construction of the end portions of the arms, and the specific form thereof; and various other changes in and modifications of the construction herein shown and described may be made within the scope of the appended claims without departing from the spirit of my invention or sacrificing its advantages.

Having fully described my invention, what I claim as new and desired to secure by Letters Patent, is:—

1. In a wheel of the class described, a plurality of tubular spider arms, the inner adjacent ends of which are flattened by bringing opposite walls of said tubular arms together to form flattened anchor members, and the hub portion being composed of cast metal molded around and imbedding the anchor members of said arms therein.

2. In a wheel of the class described, an arm or spoke member comprising a tubular body of greater transverse dimensions and thickness at the hub end than at the outer end thereof, the end portions of said member being flattened by bringing opposite walls of the tube together to form anchor parts for securing and anchoring said member to the hub of the wheel.

In testimony that I claim the foregoing as my invention I have signed by name this 8th day of March, 1927.

HENRY SOSS.